(12) United States Patent
Liao et al.

(10) Patent No.: US 11,494,100 B2
(45) Date of Patent: Nov. 8, 2022

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Mengze Liao, Shanghai (CN); Jing Yu, Shanghai (CN); Ming Zhang, Shanghai (CN); Yongsheng Guo, Shanghai (CN); Jin Ru Yan, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 197 days.

(21) Appl. No.: 16/588,903

(22) Filed: Sep. 30, 2019

(65) Prior Publication Data

US 2020/0333957 A1 Oct. 22, 2020

(30) Foreign Application Priority Data

Apr. 16, 2019 (CN) .......................... 201910303632.8

(51) Int. Cl.
*G06F 3/06* (2006.01)

(52) U.S. Cl.
CPC .............. *G06F 3/064* (2013.01); *G06F 3/065* (2013.01); *G06F 3/0619* (2013.01); *G06F 3/0667* (2013.01); *G06F 3/0673* (2013.01)

(58) Field of Classification Search
CPC ...... G06F 3/064; G06F 3/0619; G06F 3/0673; G06F 3/065; G06F 3/0667; G06F 3/0614; G06F 3/061; G06F 16/10; G06F 3/0643; G06F 3/067; G06F 16/188

See application file for complete search history.

(56) References Cited

U.S. PATENT DOCUMENTS

| | | | |
|---|---|---|---|
| 2014/0095816 A1* | 4/2014 | Hsu ..................... | G06F 11/1469 711/162 |
| 2018/0284986 A1* | 10/2018 | Bhagi ................. | G06F 11/2056 |
| 2020/0151146 A1* | 5/2020 | Drayton ............. | G06F 12/0804 |

* cited by examiner

*Primary Examiner* — David Yi
*Assistant Examiner* — Alan Otto
(74) *Attorney, Agent, or Firm* — Womble Bond Dickinson (US) LLP

(57) ABSTRACT

According to embodiments of the present disclosure, a method, device and computer program product for storage management are proposed. The method comprises: obtaining, in a first virtual storage device, a first portion storing a source file, the source file being used to update a target file; determining a second portion in the first virtual storage device, data stored in the second portion being changed relative to data stored in a second virtual storage device, the data stored in the second virtual storage device including the target file; determining a changed portion based on the first portion and the second portion, the changed portion indicating changed data of the source file relative to the target file; and updating the target file based on the changed portion. Therefore, the present solution can reduce data transmission and resource consumption.

20 Claims, 8 Drawing Sheets

METHOD, DEVICE AND COMPUTER PROGRAM PRODUCT FOR STORAGE MANAGEMENT

CROSS-REFERENCE TO RELATED APPLICATION

This patent application claims priority, under 35 U.S.C. § 119, of Chinese Patent Application No. 201910303632.8, filed Apr. 16, 2019, entitled "METHOD, DEVICE AND COMPUTER PROGRAM PRODUCT FOR STORAGE MANAGEMENT," which is incorporated by reference herein its entirety.

FIELD

Embodiments of the present disclosure generally relate to storage management, and more specifically, to a method, device and computer program product for restoring a target file based on a source file.

BACKGROUND

With the rapid development of technologies such as big data, data lake and artificial intelligence, the data growing pattern gets increasingly obvious, i.e., usually, data only increases but does not change (for technologies such as big data, data lake for business intelligence and analytics, database log files, video, streaming media), or data does not change frequently (for technologies such as text documents, Power Point documents). However, traditional storage systems usually need to transmit and restore a whole file without considering the data growing pattern. This is inefficient to data protection, especially to the File Level Restore (FLR).

SUMMARY

Embodiments of the present disclosure provide a method, device and computer program product for storage management.

In a first aspect of the present disclosure, a method for storage management is provided. The method comprises: obtaining, in a first virtual storage device, a first portion storing a source file, the source file being used to update a target file; determining a second portion in the first virtual storage device, data stored in the second portion being changed relative to data stored in a second virtual storage device, the data stored in the second virtual storage device including the target file; determining a changed portion based on the first portion and the second portion, the changed portion indicating changed data of the source file relative to the target file; and updating the target file based on the changed portion.

In a second aspect of the present disclosure, a device for storage management is provided. The device comprises at least one processing unit and at least one memory. The at least one memory is coupled to the at least one processing unit and stores instructions executed by the at least one processing unit. The instructions, when executed by the at least one processing unit, cause the device to perform acts including: obtaining, in a first virtual storage device, a first portion storing a source file, the source file being used to update a target file; determining a second portion in the first virtual storage device, data stored in the second portion being changed relative to data stored in a second virtual storage device, the data stored in the second virtual storage device including the target file; determining a changed portion based on the first portion and the second portion, the changed portion indicating changed data of the source file relative to the target file; and updating the target file based on the changed portion.

In a third aspect of the present disclosure, there is provided a computer program product. The computer program product is tangibly stored on a non-transient computer readable medium and comprises machine executable instructions which, when executed, cause the machine to implement a method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference numeral usually refers to the same component in the example embodiments of the present disclosure.

Throughout the figures, the same or corresponding numeral refers to the same or corresponding part.

DETAILED DESCRIPTION OF EMBODIMENTS

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete, and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

Figure 1:
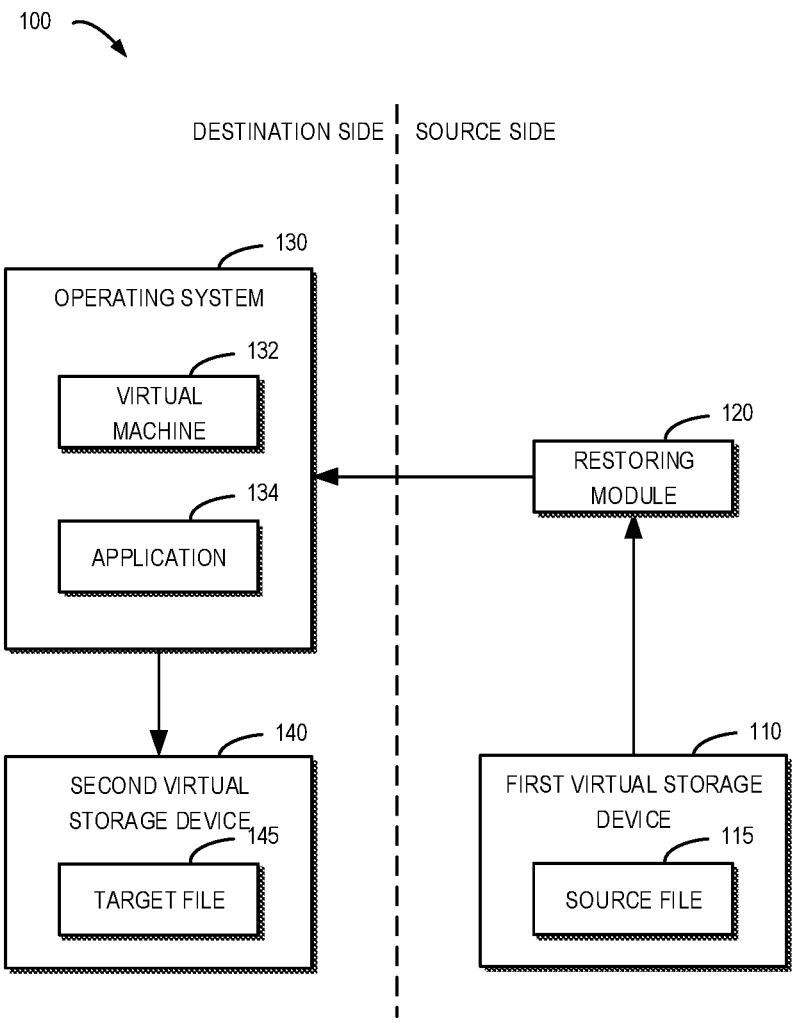
FIG. 1 shows a schematic view of an example of a traditional storage system.

FIG. 1 shows a schematic view of an example of a traditional storage system 100. As shown in FIG. 1, the storage system 100 comprises a virtual storage device 110 (referred to as "first virtual storage device 110" below), a restoring module 120, an operating system 130 and a virtual storage device 140 (referred to as "second virtual storage device 140" below). The first virtual storage device 110 and the restoring module 120 may be deemed as a source side of the storage system 100, and the operating system 130 and the virtual storage device 140 may be deemed as a destination side of the storage system 100.

At the source side of the storage system 100, the first virtual storage device 110 may be a backend data storage device and may comprise a source file 115. In some embodiments, the source file 115 may be stored in the first virtual storage device 110. The restoring module 120 may obtain the source file 115, and provide it to the operating system 130, so that the source file 115 may be used for restoring or updating a target file 145 at the destination side. For example, the restoring module 120 may be an FLR agent. Hereinafter, both terms "restore" and "update" refer to determining data of the target file 145 based on data of the source file 115, so they may be used interchangeably.

At the destination side of the storage system 100, the operating system 130 may be a customer production environment, and may comprise a virtual machine 132 and an application 134. Thereby, the virtual machine 132 and/or application 134 may be updated. The second virtual storage device 140 comprises the target file 145, which may be stored in the second virtual storage device 140. The operating system 130 may update the target file 145 by using the source file 115. In some embodiments, the target file 145 may be updated to be the same as the source file 115.

As described above, to update the target file 145 in the traditional storage system 100, the whole source file 115 needs to be transmitted between the source side and the destination side and is used for updating. However, this is unnecessary in many cases. For example, the source file 115 may not be changed, or may be just partially changed or increased. The target file 145 may be deleted, but deleted data is still in the second virtual storage device 140, or changed data of the target file 145 is written to a new location on the second virtual storage device 140, but original data of the target file 145 is not overwritten, so original data is still in the second virtual storage device 140.

When the whole source file 115 is transmitted and used for updating, the whole source file 115 needs to be read from the first virtual storage device 110, and written to the second virtual storage device 140 to update the target file. This increases the consumption of input/output (IO) resources, and increases the severity of the IO bottleneck for servers. In addition, unnecessary read and write operations will decrease the lifespan of a high-cost storage device such as a solid-state storage device (SSD), a flash and NVMe. Furthermore, compression and decompression technologies usually need to be used for transmitting the whole source file 115. With the compression ratio increasing, however, the consumption of processing resources such as a central processing unit (CPU) will increase.

To at least partially solve the foregoing problems and one or more of other potential problems, example embodiments of the present disclosure propose a solution for storage management. By mapping the source file 115 and the target file 145 to corresponding storage portions (or storage areas) on the first virtual storage device 110 and the second virtual storage device 140 respectively, and obtaining a changed portion on the first virtual storage device 110 relative to the second virtual storage device 140, the solution determines changed data in the source file 115 relative to the target file 145, so that only the changed data of the source file 115 is transmitted and used for updating the target file 145. In this way, the solution can significantly decrease data transmission between the source side and the destination side, reduce consumption of IO resources and processing resources as well as increase the lifespan of a storage device.

Figure 2:
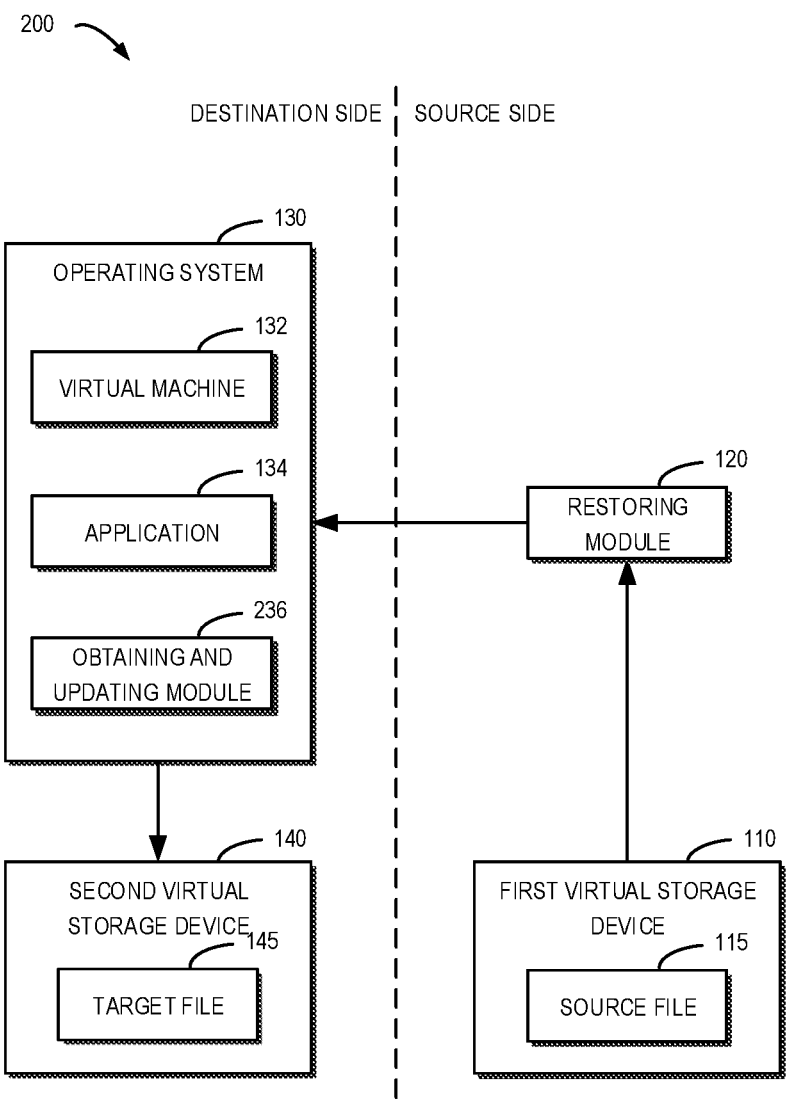
FIG. 2 shows a schematic view of an example of a storage system according to embodiments of the present disclosure.

FIG. 2 shows a schematic view of an example of a storage system 200 according to embodiments of the present disclosure. Functionality of a module in the storage system 200 is similar to functionality of a module with the same reference numeral in the traditional storage system 100. Unlike the traditional storage system 100, the storage system 200 comprises an obtaining and updating module 236. Note although in this example the obtaining and updating module 236 is shown as being included in the operating system 130, the embodiment of this module is not limited thereto. For example, the obtaining and updating module 236 may be implemented in the virtual machine 132, in the application 134, outside the operating system 130, or in the restoring module 120.

The obtaining and updating module 236 can determine changed data of the source file 115 relative to the target file 145, so that the changed data in the source file can be transmitted and used for updating the target file 145.

Specifically, the obtaining and updating module 236 obtains a portion (referred to as "first portion" below) in the first virtual storage device 110 where the source file 115 is stored. In some embodiments, the first virtual storage device 110 may comprise a plurality of storage blocks. In this case, the obtaining and updating module 236 may map the source file 115 to corresponding storage blocks storing the source file 115, and determine the corresponding storage blocks storing the source file 115 as the first portion. As described herein, the storage block refers to a virtual storage space used as a storage management unit of the storage system and having a predetermined size.

Alternatively, the restoring module 120 may determine the first portion storing the source file 115 in the first virtual storage device 110. In this case, the obtaining and updating module 236 may obtain the determined first portion from the restoring module 120. In some embodiments, when the first virtual storage device 110 comprises a plurality of storage blocks, the restoring module 120 may map the source file 115 to corresponding storage blocks storing the source file 115, and determine the corresponding storage blocks storing the source file 115 as the first portion.

The obtaining and updating module 236 determines a changed portion (referred to as "second portion" below) of data stored in the first virtual storage device 110 relative to data stored in the second virtual storage device 140. In some embodiments, the obtaining and updating module 236 may generate a snapshot (referred to as "first snapshot" below) of the first virtual storage device 110 and a snapshot (referred to as "second snapshot" below) of the second virtual storage device 140. Then, the obtaining and updating module 236 may determine a second portion by comparing the first snapshot with the second snapshot. For example, when the virtual storage device comprises a plurality of storage blocks, the obtaining and updating module 236 may determine storage blocks whose data is changed by comparing the first snapshot with the second snapshot, and further determine these storage blocks as the second portion. For example, the second portion may be changed block tracking (CBT) between the first virtual storage device 110 and the second virtual storage device 140.

Alternatively, the obtaining and updating module 236 may use an IO device driver to record changes of data stored in the first virtual storage device 110 relative to data stored in the second virtual storage device 120 and thereby determine the changed portion.

In this way, the obtaining and updating module 236 may determine the changed portion based on the determined first and second portions. The changed portion indicates changed data of the source file 115 relative to the target file 145. In some embodiments, the obtaining and updating module 236 may determine an overlapped portion between the first portion and the second portion as the changed portion.

For example, when the virtual storage device comprises a plurality of storage blocks, the obtaining and updating module 236 may determine an overlapped portion as the changed portion, the overlapped portion is between (1) the storage blocks storing the source file 115, and (2) the storage blocks regarding data stored in the first virtual storage device 110 which is changed relative to data stored in the second virtual storage device 120. It may be understood that storage blocks being "overlapped" means storage blocks of the first portion and storage blocks of the second portion contain storage blocks at the same locations.

According to embodiments of the present disclosure, the location of changed data of the source file 115 may be obtained in conjunction with the location where the source file 115 is stored in the first virtual storage device 110 and the location of changed data of the first virtual storage device 110.

Then, the obtaining and updating module 236 updates the target file 145 based on the changed portion.

According to one or more embodiments of the present disclosure, the obtaining and updating module 236 may determine a portion (referred to as "third portion" below) storing the target file 145 in the second virtual storage device 140, so as to update the target file 145. Like determining the second portion, in some embodiments, when the second virtual storage device 140 comprises a plurality of storage blocks, the obtaining and updating module 236 may map the target file 145 to corresponding storage blocks storing the target file 145, and further determine the corresponding storage blocks as the third portion.

Thereby, when the changed portion indicates data of the source file 115 is changed relative to the target file 145 (e.g., data of the storage blocks storing the source file 115 is not changed), the obtaining and updating module 236 may update the target file 145 based on the first portion, the second portion, the third portion as well as data stored in the second virtual storage device 140 and associated with the target file 145.

Alternatively, when the changed portion indicates data of the source file 115 is changed relative to the target file 145 (e.g., data of the storage block storing the source file 115 is changed), the obtaining and updating module 236 may obtain data in the changed portion of the source file 115 based on the changed portion, and update the target file 145 based on the data in the changed portion of the source file 115, the first portion, the second portion, the third portion as well as data stored in the second virtual storage device 140 and associated with the target file 145.

In this way, the present solution may determine whether the source file 115 is changed relative to the target file 145 or not. If not, the present solution may directly update data of the target file 145 to be consistent with data of the source file 115, without transmitting and using the source file 115. If yes, the present solution may only transmit and use the changed data of the source file 115 relative to the target file 145, thereby avoiding transmitting and using the whole source file 115. In any of the cases, the present solution reduces data transmission required to transmit the whole source file 115, IO resources required to read and write the whole source file 115 as well as processing resources required to compress/decompress the whole source file 115, and also increase the lifespan of the storage device.

Figure 3:
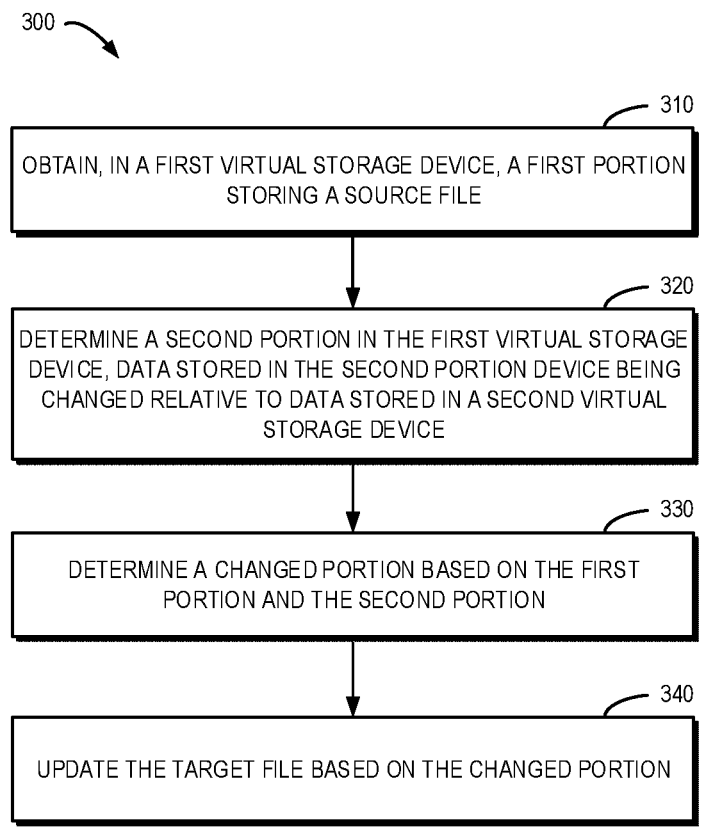
FIG. 3 shows a flowchart of a method for storage management according to embodiments of the present disclosure.
Figure 4:
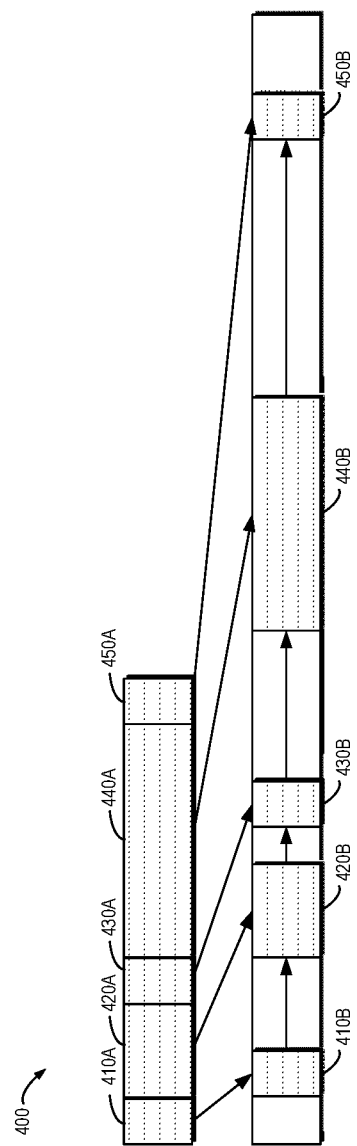
FIG. 4 shows a schematic view of an example for determining a portion storing a source file in a virtual storage device according to embodiments of the present disclosure.

With reference to FIGS. 3 to 11, specific examples of the present solution will be described in more detail. FIG. 3 shows a flowchart of a method 300 for storage management according to embodiments of the present disclosure. For example, the method 300 may be performed by the obtaining and updating module 236 as shown in FIG. 2. It should be understood the method 300 may further comprise an additional step which is not shown and/or omit a step which is shown, and the scope of the present disclosure is not shown in this regard.

At 310, the obtaining and updating module 236 may obtain a first portion storing the source file 115 in the first virtual storage device 110. The source file 115 will be used to update the target file 145. In some embodiments, the first virtual storage device 110 may comprise a plurality of storage blocks. In this case, the obtaining and updating module 236 may map the source file 115 to a corresponding storage block among the plurality of storage blocks, and determine the first portion based on the corresponding storage block storing the source file 115.

Specifically, the obtaining and updating module 236 may map the source file 115 to a corresponding storage block storing the source file 115, and determine the corresponding storage block storing the source file 115 as the first portion. For example, with reference to FIG. 4, the source file 115 may comprise continuous storage portions 410A to 450A, which may be mapped to corresponding storage blocks 410B to 450B in the first virtual storage device 110 respectively. Note as described herein, the storage block may refer to one or more storage blocks. For example, the storage blocks 410B to 450B each may comprise one or more storage blocks.

Figure 5:
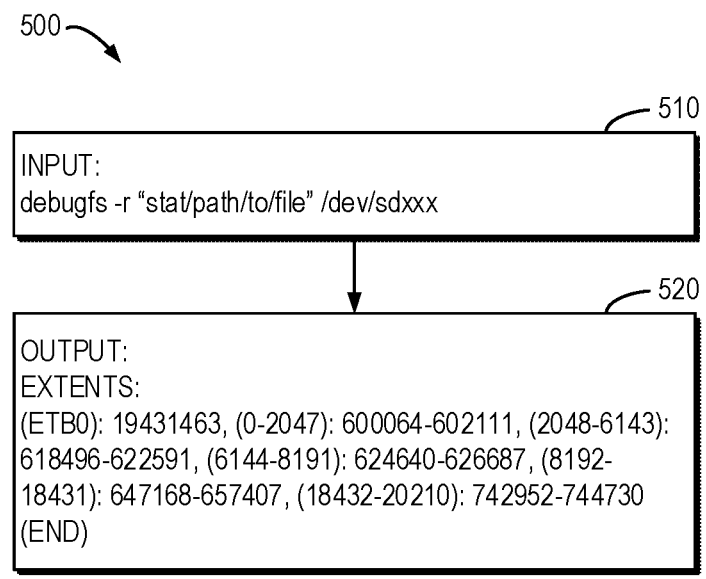
FIG. 5 shows a schematic view of another example for determining a portion storing a source file in a virtual storage device according to embodiments of the present disclosure.

More specifically, with reference to FIG. 5, when receiving an input 510 to map a file to storage blocks, the obtaining and updating module 236 may obtain an output 520 indicating a mapping between the file and the storage blocks. For example, as shown by the output 520, bytes 0-2047 of the file correspond to storage blocks within an address range 600064-602111 in the first virtual storage device 110.

Alternatively, the restoring module 120 may determine the first portion in the above way. In this case, the obtaining and updating module 236 may obtain the determined first portion from the restoring module 120.

At 320, the obtaining and updating module 236 may determine a second portion where data stored in the first virtual storage device 110 is changed relative to data stored in the second virtual storage device 140. Data stored in the second virtual storage device 140 comprises the target file 145. In some embodiments, the obtaining and updating module 236 may generate a first snapshot of the first virtual storage device 110 and a second snapshot of the second virtual storage device 140. Then, the obtaining and updating module 236 may determine the second portion by comparing the first snapshot with the second snapshot.

Figure 6:
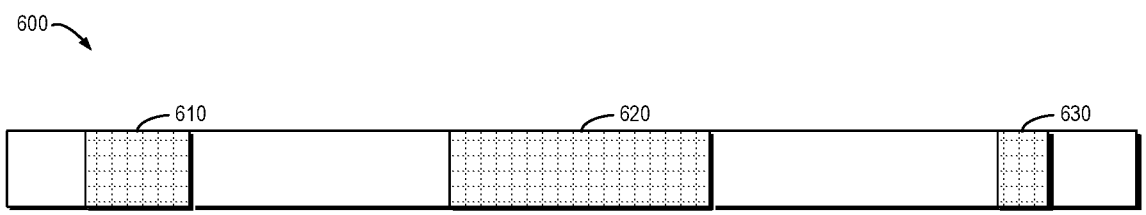
FIG. 6 shows a schematic view of an example for determining a portion in a virtual storage device comprising a source file, in which data stored in the portion is changed relative to data stored in a virtual storage device comprising a target file, according to embodiments of the present disclosure.
Figure 7:
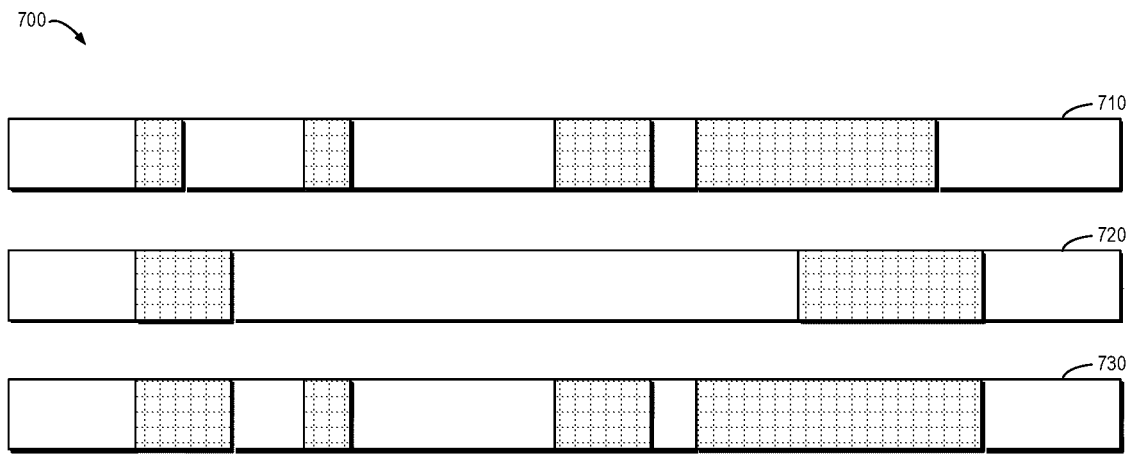
FIG. 7 shows a schematic view of another example for determining a portion in a virtual storage device comprising a source file, in which data stored in the portion is changed relative to data stored in a virtual storage device comprising a target file, according to embodiments of the present disclosure.

For example, as shown in FIG. 6, when the virtual storage device comprises a plurality of storage blocks, the obtaining and updating module 236 may determine storage blocks 610-630 of changed data by comparing the first snapshot with the second snapshot, and determine these storage blocks as the second portion. Note the storage blocks 610-630 each may comprise one or more storage blocks.

In some embodiments, there may exist a plurality of intermediate second portions. For example, at a first time point, the obtaining and updating module 236 may generate a snapshot of the first virtual storage device 110 and a snapshot of the second virtual storage device 140, thereby determining an intermediate second portion 710. Then, at a second time point, the obtaining and updating module 236 may once again generate a snapshot of the first virtual storage device 110 and a snapshot of the second virtual storage device 140, thereby determining an intermediate second portion 720. In this case, the intermediate second portions 710 and 720 need to be combined to generate a second portion 730.

Thus, at 330, the obtaining and updating module 236 may determine a changed portion based on the first portion and the second portion. The changed portion indicates changed data of the source file 115 relative to the target file 145. In some embodiments, the obtaining and updating module 236 may determine an overlapped portion between the first portion and the second portion as the changed portion.

Figure 8:
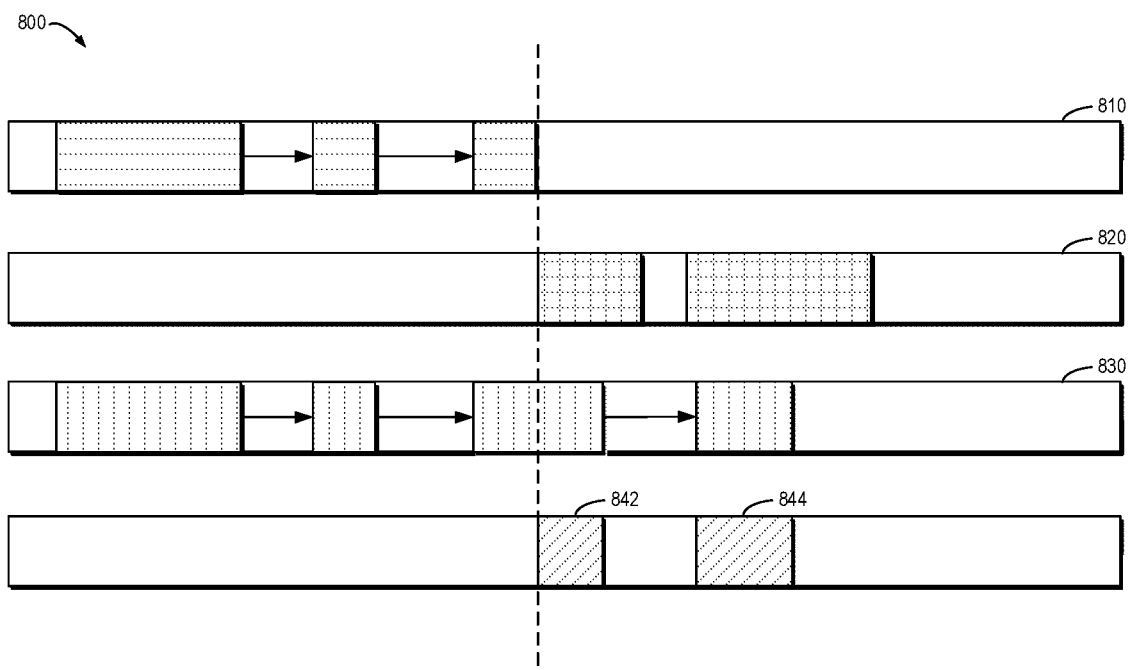
FIG. 8 shows a schematic view of an example for updating a target file according to embodiments of the present disclosure.
Figure 9:
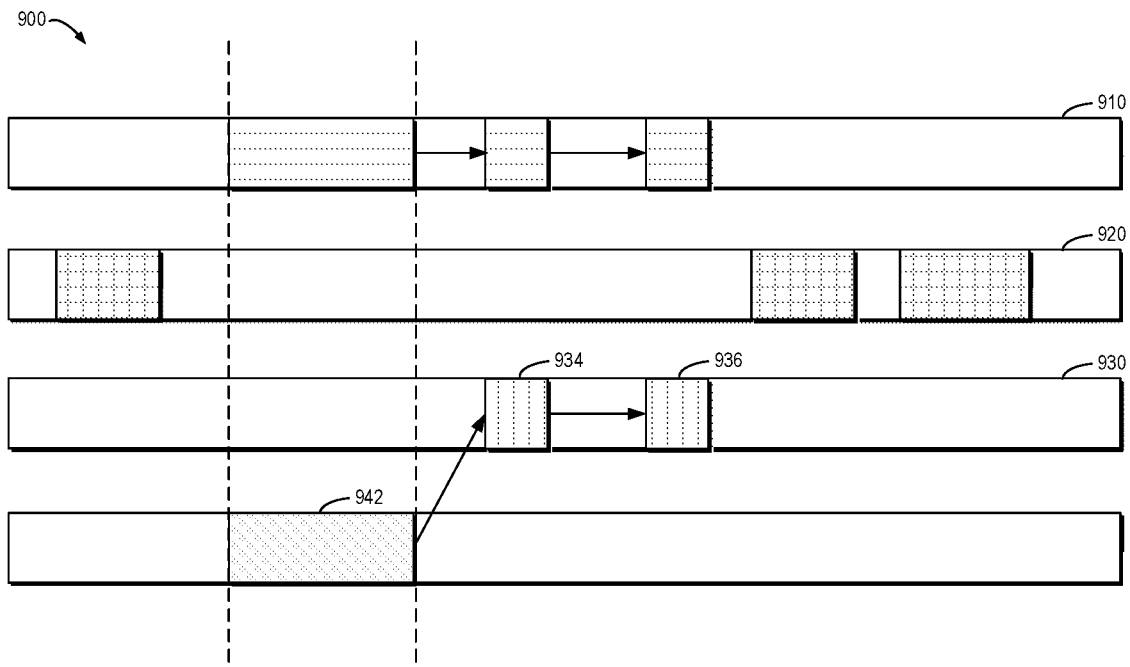
FIG. 9 shows a schematic view of another example for updating a target file according to embodiments of the present disclosure.
Figure 10:
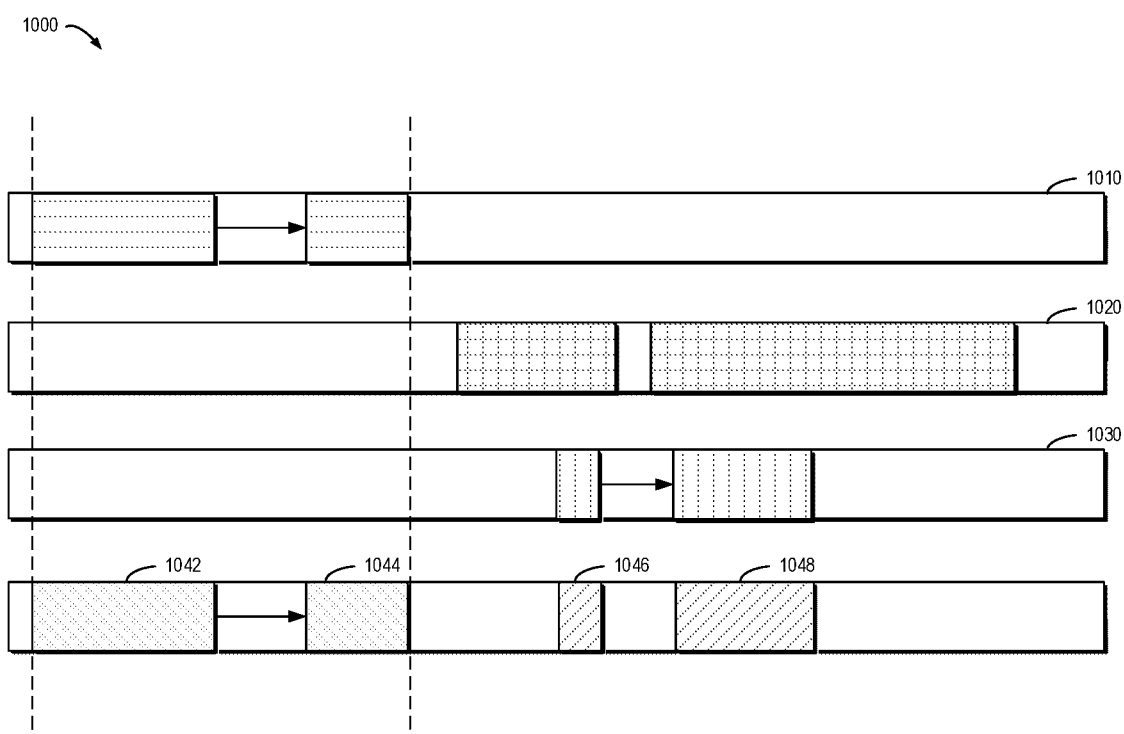
FIG. 10 shows a schematic view of yet another example for updating a target file according to embodiments of the present disclosure.
Figure 11:
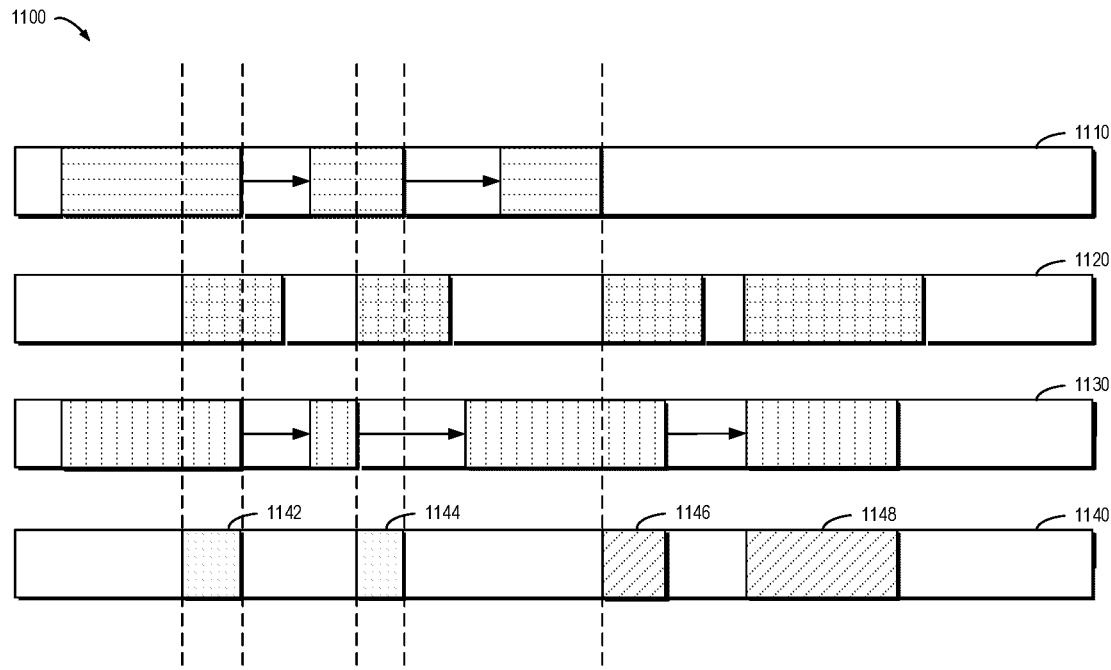
FIG. 11 shows a schematic view of still another example for updating a target file according to embodiments of the present disclosure.

For example, as shown in FIGS. 8 to 10, there is no overlapped portion between a first portion 810 and a second portion 820 in FIG. 8, there is no overlapped portion between a first portion 910 and a second portion 920 in FIG. 9, and there is no overlapped portion between a first portion 1010 and a second portion 1020 in FIG. 10. It may be understood that the overlapped portion does not exist means storage blocks of the first portion and storage blocks of the second portion contain no storage block at the same location. Since there is zero storage block in the overlapped portion or changed portion, the changed portion may indicate the source file 115 does not contain changed data relative to the target file 145. On the contrary, as shown in FIG. 11, there is an overlapped portion or changed portion between a first portion 1110 and a second portion 1120, the changed portion may indicate the source file 115 contains changed data relative to the target file 145, as shown by 1142 and 1144.

Then, at 340, the obtaining and updating module 236 may update the target file 145 based on the changed portion. To update the target file 145, the obtaining and updating module 236 may further determine a third portion storing the target file 145 in the second virtual storage device 140. The third portion may be determined using the method for determining the first portion as described at 310, description of which is omitted here.

Thereby, on the one hand, when the changed portion indicates the source file 115 does not contain changed data relative to the target file 145, the obtaining and updating module 236 may update the target file 145 based on the first portion, the second portion, the third portion as well as data associated with the target file 145 and stored in the second virtual storage device 140.

For example, as described above, in FIGS. 8 to 10, the changed portion indicates the source file 115 does not contain changed data relative to the target file 145. In this case, the obtaining and updating module 236 may directly update data of the target file 145 to be consistent with data of the source file 115, without transmitting and using the source file 115.

Specifically, in an example 800 shown in FIG. 8, the obtaining and updating module 236 may compare the first portion 810, the second portion 820 and the third portion 830, and determine data stored in storage blocks 842 and 844 associated with the target file 145 in the second virtual storage device 140 should be deleted, so as to update data of the target file 145 to be consistent with data of the source file 115. The obtaining and updating module 236 may update metadata of the target file 145, so that the target file 145 no longer comprises data in the storage blocks 842 and 844.

As another example, in an example 900 shown in FIG. 9, the obtaining and updating module 236 may compare the first portion 910, the second portion 920 and a third portion 930, and determine data stored in a storage block 942 associated with the target file 145 in the second virtual storage device 140 should be inserted to the target file 145, and the data is still in the storage block 942 without being changed. The obtaining and updating module 236 may update metadata of the target file 145, so that the target file 145 comprises data in the storage block 942 again, and is updated to comprise storage blocks 942, 934 and 936.

As a further example, in an example 1000 shown in FIG. 10, the obtaining and updating module 236 may compare the first portion 1010, the second portion 1020 and a third portion 1030, and determine data stored in storage blocks 1042 and 1044 associated with the target file 145 in the second virtual storage device 140 should be inserted to the target file 145, and the data is still in the storage blocks 1042 and 1044 without being changed. In addition, the obtaining and updating module 236 may further determine data stored in storage blocks 1046 and 1048 associated with the target file 145 in the second virtual storage device 140 should be deleted. The obtaining and updating module 236 may update metadata of the target file 145, so that the target file 145 comprises data in the storage blocks 1042 and 1044 again, while no longer comprising data in the storage blocks 1046 and 1048.

On the other hand, when the changed portion indicates the source file 115 contains changed data relative to the target file 145, the obtaining and updating module 236 may obtain data in the changed portion in the source file 115 based on the changed portion. Then, the obtaining and updating module 236 may update the target file 145 based on the data in the changed portion in the source file 115, the first portion, the second portion, the third portion as well as data associated with the target file 145 and stored in the second virtual storage device 140.

For example, as described above, in FIG. 11, the changed portion indicates the source file 115 contains changed data relative to the target file 145. In this case, the obtaining and updating module 236 may only transmit and use changed data of the source file 115 relative to the target file 145, so as to update the target file 145 while avoiding transmitting and using the whole source file 115.

Specifically, in an example 1100 shown in FIG. 11, the obtaining and updating module 236 may determine storage blocks 1142 and 1144 in the source file 115 are changed relative to the target file 145. In addition, the obtaining and updating module 236 may compare the first portion 1110, the second portion 1120 and a third portion 1130, and determine data stored in storage blocks 1146 and 1148 associated with the target file 145 in the second virtual storage device 140 should be deleted, so as to update data of the target file 145 to be consistent with data of the source file 115.

In this case, the obtaining and updating module 236 may obtain data in the storage blocks 1142 and 1144 storing the source file 115 in the first virtual storage device 110, and update data in the storage blocks 1142 and 1144 storing the target file 145 in the second virtual storage device 140 with the obtained data. In addition, the obtaining and updating module 236 may further update metadata of the target file 145, so that the target file 145 no longer comprises data in the storage blocks 1146 and 1148.

In this way, the present solution may update data or metadata of the target file 145 without using the source file 115 or only using the changed portion of the source file 115. Therefore, the present solution can reduce data transmission and consumption of IO resources and processing resources, and improve the lifespan of the storage device.

Figure 12:
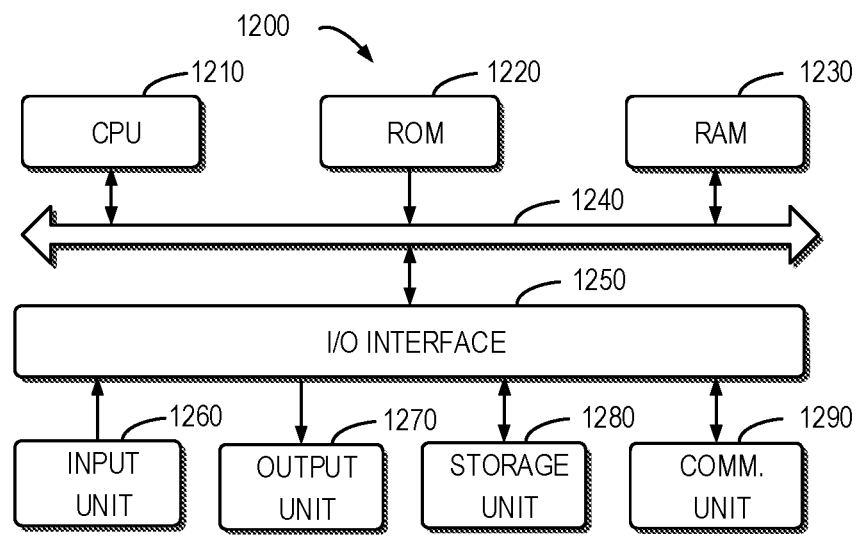
FIG. 12 shows a schematic block diagram of an example device which is applicable to implement embodiments of the present disclosure.

FIG. 12 shows a schematic block diagram of an example device 1200 which is applicable to implement embodiments of the present disclosure. For example, the obtaining and updating module 236 as shown in FIG. 2 may be implemented by the device 1200. As depicted, the device 1200 includes a central process unit (CPU) 1210, which can execute various suitable actions and processing based on the computer program instructions stored in the read-only memory (ROM) 1220 or computer program instructions loaded in the random-access memory (RAM) 1230 from a storage unit 1280. The RAM 1230 can also store all kinds of programs and data required by the operations of the device 1200. CPU 1210, ROM 1220 and RAM 1230 are connected to each other via a bus 1240. The input/output (I/O) interface 1250 is also connected to the bus 1240.

A plurality of components in the device 1200 are connected to the I/O interface 1250, including: an input unit 1260, such as keyboard, mouse and the like; an output unit 1270, e.g., various kinds of display and loudspeakers etc.; a storage unit 1280, such as magnetic disk and optical disk etc.; and a communication unit 1290, such as network card, modem, wireless transceiver and the like. The communication unit 1290 allows the device 1200 to exchange information/data with other devices via the computer network, such as Internet, and/or various telecommunication networks.

The above described procedure and processing, such as the method 300, can also be executed by the processing unit 1210. For example, in some embodiments, the method 300 can be implemented as a computer software program tangibly included in the machine-readable medium, e.g., the storage unit 1280. In some embodiments, the computer program can be partially or fully loaded and/or installed onto the device 1200 via ROM 1220 and/or the communication unit 1290. When the computer program is loaded onto the RAM 1230 and executed by the CPU 1210, one or more actions of the above described method 300 can be implemented.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing devices. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via a network, such as Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages include object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program product according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions specified in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions specified in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions specified in one or more blocks of the flow chart and/or block diagram.

The flow chart and block diagram in the drawings illustrate system architecture, functions and operations that may be implemented by system, method and computer program product according to a plurality of embodiments of the present disclosure. In this regard, each block in the flow chart or block diagram can represent a part of a module, program segment or code, wherein the part of the module, program segment or code include one or more executable instructions for performing specified logic functions. In some alternative embodiments, the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing specified functions or actions, or by a combination of dedicated hardware and computer instructions.

Various embodiments of the present disclosure have been described above, and the above description is only exemplary, rather than exhaustive, and is not limited to the embodiments of the present disclosure. Many modifications and alterations, without deviating from the scope and spirit of the explained various embodiments, are obvious for those of ordinary skill in the art. The selection of terms in the text aims to best explain principles and actual applications of the embodiments and technical improvements made in the market by each the embodiments, or enable other ordinary skilled in the art to understand the embodiments of the present disclosure.

We claim:

1. A method for storage management, comprising: obtaining, in a first virtual storage device, a first portion storing a source file, the source file being used to update a target file, wherein the first virtual storage device includes a plurality of storage blocks; determining a second portion in the first virtual storage device, data stored in the second portion being changed relative to data stored in a second virtual storage device, the data stored in the second virtual storage device including the target file, wherein determining the second portion comprises: generating a first snapshot of the first virtual storage device at a first time point, generating a second snapshot of the second virtual storage device at the first time point, determining a first intermediate second portion, generating a third snapshot of the first virtual storage device at a second time point, generating a fourth snapshot of the second virtual storage device at the second time point, determining a second intermediate second portion, and generating the second portion by combining the first intermediate second portion and the second intermediate second portion; determining a changed portion based on the first portion and the second portion, wherein determining the changed portion includes recording changes of data stored in the first virtual storage device relative to data stored in the second virtual storage device using an IO device driver, the changed portion indicating changed data of the source file relative to the target file; and updating the target file based on the changed portion.

2. The method of claim 1, further comprising:
   determining, in the second virtual storage device, a third portion storing the target file.

3. The method of claim 1, wherein obtaining the first portion comprises:
   mapping the source file to a corresponding storage block among the plurality of storage blocks; and
   determining the first portion based on the corresponding storage block.

4. The method of claim 1, wherein determining the second portion comprises:
   determining the second portion by comparing the first snapshot with the second snapshot.

5. The method of claim 1, wherein determining the changed portion comprises:
   determining an overlapped portion between the first portion and the second portion as the changed portion.

6. The method of claim 2, wherein the second virtual storage device comprises a plurality of storage blocks, and determining the third portion comprises:
   mapping the target file to a corresponding storage block among the plurality of storage blocks; and
   determining the third portion based on the corresponding storage block.

7. The method of claim 2, wherein updating the target file comprises:
   in response to the changed portion indicating the source file does not contain changed data relative to the target file, updating the target file based on the first portion, the second portion, the third portion, and data stored in the second virtual storage device and associated with the target file.

8. The method of claim 2, wherein updating the target file comprises:
in response to the changed portion indicating the source file contains changed data relative to the target file, obtaining data in the changed portion in the source file based on the changed portion; and
updating the target file based on data in the changed portion in the source file, the first portion, the second portion, the third portion, and data stored in the second virtual storage device and associated with the target file.

9. A device for storage management, comprising: at least one processing unit; at least one memory coupled to the at least one processing unit and storing instructions executed by the at least one processing unit, the instructions, when executed by the at least one processing unit, causing the device to perform acts comprising: obtaining, in a first virtual storage device, a first portion storing a source file, the source file being used to update a target file, wherein the first virtual storage device comprises a plurality of storage blocks, and; determining a second portion in the first virtual storage device, data stored in the second portion being changed relative to data stored in a second virtual storage device, data stored in the second virtual storage device including the target file, wherein determining the second portion comprises: generating a first snapshot of the first virtual storage device at a first time point, generating a second snapshot of the second virtual storage device at the first time point, determining a first intermediate second portion, generating a third snapshot of the first virtual storage device at a second time point, generating a fourth snapshot of the second virtual storage device at the second time point, determining a second intermediate second portion, and generating the second portion by combining the first intermediate second portion and the second intermediate second portion; determining a changed portion based on the first portion and the second portion, wherein determining the changed portion includes recording changes of data stored in the first virtual storage device relative to data stored in the second virtual storage device using an IO device driver, the changed portion indicating changed data of the source file relative to the target file; and updating the target file based on the changed portion.

10. The device of claim 9, the acts further comprising:
determining, in the second virtual storage device, a third portion storing the target file.

11. The device of claim 9, wherein obtaining the first portion comprises:
mapping the source file to a corresponding storage block among the plurality of storage blocks; and
determining the first portion based on the corresponding storage block.

12. The device of claim 9, wherein determining the second portion comprises:
determining the second portion by comparing the first snapshot with the second snapshot.

13. The device of claim 9, wherein determining the changed portion comprises:
determining an overlapped portion between the first portion and the second portion as the changed portion.

14. The device of claim 10, wherein the second virtual storage device comprises a plurality of storage blocks, and determining the third portion comprises:
mapping the target file to a corresponding storage block among the plurality of storage blocks; and
determining the third portion based on the corresponding storage block.

15. The device of claim 10, wherein updating the target file comprises:
in response to the changed portion indicating the source file does not contain changed data relative to the target file, updating the target file based on the first portion, the second portion, the third portion, and data stored in the second virtual storage device and associated with the target file.

16. The device of claim 10, wherein updating the target file comprises:
in response to the changed portion indicating the source file contains changed data relative to the target file, obtaining data in the changed portion in the source file based on the changed portion; and
updating the target file based on data in the changed portion in the source file, the first portion, the second portion, the third portion, and data stored in the second virtual storage device and associated with the target file.

17. A computer program product, tangibly stored on a non-transient computer readable medium and comprising machine executable instructions which, when executed, cause a machine to implement a method for storage management, the method comprising: obtaining, in a first virtual storage device, a first portion storing a source file, the source file being used to update a target file, the first virtual storage device comprises a plurality of storage blocks, and; determining a second portion in the first virtual storage device, data stored in the second portion being changed relative to data stored in a second virtual storage device, the data stored in the second virtual storage device including the target file, wherein determining the second portion comprises: generating a first snapshot of the first virtual storage device at a first time point, generating a second snapshot of the second virtual storage device at the first time point, determining a first intermediate second portion, generating a third snapshot of the first virtual storage device at a second time point, generating a fourth snapshot of the second virtual storage device at the second time point, determining a second intermediate second portion, and generating the second portion by combining the first intermediate second portion and the second intermediate second portion; determining a changed portion based on the first portion and the second portion, wherein determining the changed portion includes recording changes of data stored in the first virtual storage device relative to data stored in the second virtual storage device using an IO device driver, the changed portion indicating changed data of the source file relative to the target file; and updating the target file based on the changed portion.

18. The computer program product of claim 17, wherein the method further comprises:
determining, in the second virtual storage device, a third portion storing the target file.

19. The computer program product of claim 17, wherein obtaining the first portion comprises:
mapping the source file to a corresponding storage block among the plurality of storage blocks; and
determining the first portion based on the corresponding storage block.

20. The computer program product of claim 17, wherein determining the second portion comprises:

determining the second portion by comparing the first snapshot with the second snapshot.

* * * * *